US011232453B2

(12) United States Patent
Piel et al.

(10) Patent No.: US 11,232,453 B2
(45) Date of Patent: Jan. 25, 2022

(54) METHOD AND SYSTEM FOR AUTHENTICATION DATA COLLECTION AND REPORTING

(71) Applicant: MasterCard International Incorporated, Purchase, NY (US)

(72) Inventors: Brian John Piel, Ballwin, MO (US); Anand Reddy Mallepally, O'Fallon, MO (US); Paul Stephen Baker, West Yorkshire (GB); Mark Hey, Saint Peters, MO (US)

(73) Assignee: Mastercard International Incorporated, Purchase, NY (US)

( * ) Notice: Subject to any disclaimer, the term of this patent is extended or adjusted under 35 U.S.C. 154(b) by 1006 days.

(21) Appl. No.: 14/871,444

(22) Filed: Sep. 30, 2015

(65) Prior Publication Data

US 2017/0091772 A1    Mar. 30, 2017

(51) Int. Cl.
| | | |
|---|---|---|
| *G06Q 20/40* | (2012.01) | |
| *G06Q 20/38* | (2012.01) | |
| *G06Q 20/36* | (2012.01) | |
| *G06Q 20/12* | (2012.01) | |
| *G06Q 30/06* | (2012.01) | |

(52) U.S. Cl.
CPC ......... *G06Q 20/4016* (2013.01); *G06Q 20/12* (2013.01); *G06Q 20/36* (2013.01); *G06Q 20/382* (2013.01); *G06Q 20/3827* (2013.01); *G06Q 20/40* (2013.01); *G06Q 30/0609* (2013.01)

(58) Field of Classification Search
USPC ........................................................ 705/50
See application file for complete search history.

(56) References Cited

U.S. PATENT DOCUMENTS

| | | | | | |
|---|---|---|---|---|---|
| 5,111,198 | A | * | 5/1992 | Kuszmaul | ............... H04L 45/24 340/2.4 |
| 5,260,942 | A | * | 11/1993 | Auerbach | ............... H04L 12/56 370/474 |
| 5,669,005 | A | * | 9/1997 | Curbow | ............... G06F 17/218 715/234 |
| 5,675,521 | A | * | 10/1997 | Holzhauer | .......... G06F 17/5018 706/45 |
| 5,835,919 | A | * | 11/1998 | Stern | ..................... G06F 3/0481 715/209 |

(Continued)

FOREIGN PATENT DOCUMENTS

WO    WO-2013163648 A2 *  10/2013    ............. H04L 67/06

OTHER PUBLICATIONS

"PCT Notification of Transmittal of the International Search Report and the Written Opinion" International Searching Authority, dated Nov. 21, 2016 (Nov. 21, 2016), for International Application No. PCT/US2016/051615, 12pgs.

(Continued)

*Primary Examiner* — John W Hayes
*Assistant Examiner* — Ari Shahabi
(74) *Attorney, Agent, or Firm* — Buckley, Maschoff & Talwalkar LLC

(57) ABSTRACT

Methods, media, and systems directed to a platform for determining, processing, storing, and analyzing authentication data from various internal and external systems within an authentication ecosystem, and from other authentication systems providing authentication services.

10 Claims, 7 Drawing Sheets

(56) References Cited

U.S. PATENT DOCUMENTS

| | | | | |
|---|---|---|---|---|
| 5,943,426 A * | 8/1999 | Frith | ............ | H04L 29/06 713/153 |
| 6,100,899 A * | 8/2000 | Ameline | ............ | G09G 5/393 345/605 |
| 6,336,122 B1 * | 1/2002 | Lee | ............ | G06F 16/289 |
| 6,389,541 B1 * | 5/2002 | Patterson | ............ | G06F 21/10 705/53 |
| 6,600,982 B1 * | 7/2003 | Cragun | ............ | G06F 16/40 701/36 |
| 7,092,399 B1 * | 8/2006 | Cheriton | ............ | H04L 67/1008 370/401 |
| 7,797,441 B1 * | 9/2010 | Barnes | ............ | G06F 15/16 709/231 |
| 8,532,802 B1 * | 9/2013 | Johnston | ............ | G11B 27/034 381/17 |
| 9,613,377 B2 * | 4/2017 | Sheets | ............ | G06Q 40/02 |
| 2002/0073429 A1 * | 6/2002 | Beane | ............ | G06F 19/321 725/105 |
| 2002/0095510 A1 * | 7/2002 | Sie | ............ | H04N 7/17336 709/231 |
| 2002/0169625 A1 * | 11/2002 | Yang | ............ | G06F 21/10 705/59 |
| 2003/0023549 A1 * | 1/2003 | Armes | ............ | G06Q 20/02 705/40 |
| 2003/0101227 A1 * | 5/2003 | Fink | ............ | H04L 29/06 709/207 |
| 2003/0154406 A1 | 8/2003 | Honarav et al. | | |
| 2003/0200184 A1 * | 10/2003 | Dominguez | ............ | G06Q 20/02 705/78 |
| 2003/0218062 A1 * | 11/2003 | Noriega | ............ | G06Q 20/02 235/380 |
| 2004/0122902 A1 * | 6/2004 | Anderson | ............ | G06Q 10/10 709/206 |
| 2004/0254848 A1 * | 12/2004 | Golan | ............ | G06Q 20/04 705/50 |
| 2005/0185799 A1 * | 8/2005 | Bertram | ............ | A61B 5/0002 381/67 |
| 2005/0246278 A1 * | 11/2005 | Gerber | ............ | G06Q 20/02 705/44 |
| 2005/0285733 A1 * | 12/2005 | Gualdi | ............ | G07C 9/00103 340/539.13 |
| 2006/0029016 A1 * | 2/2006 | Peles | ............ | H04L 43/022 370/328 |
| 2006/0180660 A1 * | 8/2006 | Gray | ............ | G06Q 20/24 235/380 |
| 2006/0200519 A1 * | 9/2006 | Clement | ............ | H04L 12/1831 709/204 |
| 2006/0282382 A1 | 12/2006 | Balasubramanian et al. | | |
| 2007/0057866 A1 * | 3/2007 | Lee | ............ | H04M 1/0218 345/1.1 |
| 2007/0067362 A1 * | 3/2007 | McArdle | ............ | G06F 16/113 |
| 2007/0198829 A1 * | 8/2007 | McGrew | ............ | H04L 63/0435 713/155 |
| 2008/0263102 A1 * | 10/2008 | Mochizuki | ............ | G06F 21/645 |
| 2009/0037982 A1 * | 2/2009 | Wentker | ............ | G06F 21/33 726/3 |
| 2009/0125719 A1 * | 5/2009 | Cochran | ............ | G06Q 30/02 713/171 |
| 2009/0164331 A1 * | 6/2009 | Bishop | ............ | G06Q 20/04 705/19 |
| 2010/0082486 A1 * | 4/2010 | Lee | ............ | G06Q 20/12 705/44 |
| 2010/0114740 A1 * | 5/2010 | Dominguez | ............ | G06Q 20/40 705/26.1 |
| 2010/0114776 A1 * | 5/2010 | Weller | ............ | G06F 21/31 705/44 |
| 2010/0242025 A1 * | 9/2010 | Yamazaki | ............ | G06F 11/3476 717/127 |
| 2010/0312703 A1 * | 12/2010 | Kulpati | ............ | G06Q 20/32 705/44 |
| 2011/0016051 A1 * | 1/2011 | Trifiletti | ............ | G06Q 20/20 705/44 |
| 2011/0035319 A1 * | 2/2011 | Brand | ............ | G06Q 20/10 705/44 |
| 2011/0119155 A1 * | 5/2011 | Hammad | ............ | G06F 21/34 705/26.41 |
| 2011/0196791 A1 * | 8/2011 | Dominguez | ............ | G06Q 20/40 705/44 |
| 2011/0208658 A1 * | 8/2011 | Makhotin | ............ | G06F 21/34 705/75 |
| 2011/0288888 A1 * | 11/2011 | Gazula | ............ | G06Q 10/10 705/3 |
| 2011/0313898 A1 | 12/2011 | Singhal et al. | | |
| 2012/0011066 A1 * | 1/2012 | Telle | ............ | G06Q 20/385 705/44 |
| 2012/0018505 A1 | 1/2012 | Hammad et al. | | |
| 2012/0018506 A1 * | 1/2012 | Hammad | ............ | G06F 21/34 235/375 |
| 2012/0023090 A1 * | 1/2012 | Holloway | ............ | H04L 67/28 707/709 |
| 2012/0041877 A1 * | 2/2012 | Rao | ............ | G06Q 20/108 705/43 |
| 2012/0117641 A1 * | 5/2012 | Holloway | ............ | G06F 16/958 726/12 |
| 2012/0143752 A1 | 6/2012 | Wong et al. | | |
| 2012/0166582 A1 * | 6/2012 | Binder | ............ | H04L 63/18 709/217 |
| 2012/0183928 A1 * | 7/2012 | Finlayson | ............ | F41G 3/2655 434/16 |
| 2012/0254092 A1 | 10/2012 | Malov et al. | | |
| 2012/0262572 A1 * | 10/2012 | Cudak | ............ | H04N 5/2226 348/135 |
| 2012/0290609 A1 * | 11/2012 | Britt | ............ | G06Q 30/06 707/769 |
| 2013/0054338 A1 * | 2/2013 | Merz | ............ | G06Q 30/0224 705/14.27 |
| 2013/0073463 A1 * | 3/2013 | Dimmick | ............ | G06Q 20/40 705/44 |
| 2013/0173752 A1 * | 7/2013 | Choi | ............ | G06F 16/1734 709/219 |
| 2013/0262579 A1 * | 10/2013 | Chandler | ............ | H04L 67/02 709/204 |
| 2013/0311482 A1 * | 11/2013 | Schleier-Smith | ... | G06F 16/2272 707/746 |
| 2014/0101036 A1 * | 4/2014 | Phillips | ............ | G06Q 20/027 705/39 |
| 2014/0115335 A1 * | 4/2014 | Jorden | ............ | G07C 5/008 713/169 |
| 2014/0129435 A1 * | 5/2014 | Pardo | ............ | G06Q 20/36 705/41 |
| 2014/0185443 A1 * | 7/2014 | Safavi | ............ | H04W 28/0247 370/235 |
| 2014/0279477 A1 * | 9/2014 | Sheets | ............ | G06Q 40/02 705/41 |
| 2015/0039506 A1 * | 2/2015 | Groarke | ............ | G06Q 20/02 705/44 |
| 2015/0120559 A1 | 4/2015 | Fisher et al. | | |
| 2015/0161608 A1 * | 6/2015 | Gilbert | ............ | G06Q 20/4014 705/44 |
| 2015/0170141 A1 * | 6/2015 | Klingen | ............ | G06F 16/951 705/41 |
| 2015/0178393 A1 * | 6/2015 | Perrin | ............ | G06Q 10/00 707/722 |
| 2015/0186908 A1 * | 7/2015 | Taskin | ............ | G06Q 30/0204 705/7.33 |
| 2015/0193511 A1 * | 7/2015 | Woody | ............ | G06F 16/248 707/722 |
| 2015/0206540 A1 * | 7/2015 | Green | ............ | G10L 19/00 704/207 |
| 2015/0269580 A1 * | 9/2015 | Subramanian | ..... | G06Q 20/4016 705/44 |

OTHER PUBLICATIONS

Anonymous: "Computer network—Wikipedia, the free encyclopedia", Jan. 31, 2010 (Jan. 31, 2010), XP055117444, Yetrieved from

(56) References Cited

OTHER PUBLICATIONS the Internet: URL:http://en.wikipedia.org/w/index.php?title=Computer_network&oldid=341100015, retrieved on May 12, 2014, 9pgs.
European Examination Report dated May 27, 2019 which was issued in connection with EP16770425.3 which was filed on Sep. 14, 2016.
"Extended European Search Report", dated Mar. 12, 2020, for European Application No. 19213754, 7 pgs.
Canadian Office Action dated Dec. 20, 2019 for Application No. 2,999,236, Canadian Patent Office, 6 pp.
"Japanese Office Action", dated Nov. 8, 2019, for Japanese Application No. 2018-514294, 3pgs.
"English-language Translation of Japanese Office Action", dated Nov. 8, 2019, for Japanese Application No. 2018-514294, 3pgs.
"Notification of the First Office Action with English Translation", China National Intellectual Property Administration, dated Jun. 3, 2021, for Chinese Application No. 201780036397.X, 17 pp.
"Communication pursuant to Article 94(3) EPC", dated May 20, 2021, for European Application No. 19213754.5, 9 pp.

\* cited by examiner

300

RECEIVE A REQUEST FOR AN AUTHENTICATION VALUE FOR A
TRANSACTION IN AN API CALL FROM AN APPLICATION

305

DETERMINE THE REQUEST FOR THE AUTHENTICATION VALUE INCLUDES
AN INDICATION OF A FIRST TRANSACTION TYPE

310

GENERATE, IN RESPONSE TO THE DETERMINATION THAT THE REQUEST
FOR THE AUTHENTICATION VALUE INCLUDES AN INDICATION OF THE
FIRST TRANSACTION TYPE, AN AUTHENTICATION VALUE
FOR THE TRANSACTION

315

SEND, TO THE CALLING APPLICATION, AN API RESPONSE INCLUDING THE
GENERATED AUTHENTICATION VALUE FOR THE TRANSACTION

RECEIVE FROM AT LEAST ONE ACCESS CONTROL SERVER (ACS) EXTERNAL TO A PARTICULAR ENTERPRISE ENVIRONMENT, A PAYER AUTHENTICATION REQUEST (PAReq) MESSAGE AND A PAYER AUTHENTICATION RESPONSE (PARes) MESSAGE ASSOCIATED WITH A TRANSACTION
605

RECEIVE FROM AT LEAST ONE ACCESS CONTROL SERVER (ACS) INTERNAL TO THE ENTERPRISE ENVIRONMENT, A VERIFY ENROLLMENT REQUEST (VEReq) MESSAGE AND A VERIFY ENROLLMENT RESPONSE (VERes) MESSAGE ASSOCIATED WITH THE TRANSACTION
610

COMBINE THE PAReq MESSAGE AND THE PARes MESSAGE ASSOCIATED WITH THE TRANSACTION WITH THE VEReq MESSAGE AND THE VERes MESSAGE ASSOCIATED WITH THE TRANSACTION INTO A SINGLE DATA RECORD
615

STORE THE SINGLE DATA RECORD IN A DATA STORAGE DEVICE
620

*FIG. 6*

METHOD AND SYSTEM FOR AUTHENTICATION DATA COLLECTION AND REPORTING

BACKGROUND

Traditionally, a major concern of merchants and issuers of payment cards (such as credit or debit cards) in an online shopping contexts and other "card not present" transactions where the cardholder is not physically present with the payment card at the time a payment or purchase is being made is whether the person attempting to use the card is in fact an authorized cardholder or user of the card. When a cardholder is not present, it may be difficult for the merchant to authenticate or verify that the actual cardholder is indeed authorizing a purchase.

In an effort to reduce the incidence of credit card fraud in online purchase and other "card not present" transactions, a number of systems have been proposed and used to verify that the person using the card is authorized to use the card. In this regard, one security protocol developed to add a layer of additional security to online credit and debit transactions is the 3-D Secure (3DS) Protocol. This protocol was designed to allow a credit card issuer to authenticate their cardholder(s) while the cardholders shop online or in other "card not present" scenarios. However, the 3DS and other authentication processes and systems proposed heretofore are typically closed-loop systems that are complex, costly to implement, and primarily directed to authenticating the identity of the cardholder.

Therefore, it would be desirable to provide improved methods and apparatus for efficiently facilitating and processing authentication of an entity for business analytics and reporting.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, wherein:

FIG. 3 is a flow diagram of a process, in accordance with some embodiments herein;

FIG. 6 is a flow diagram of a process, in accordance with some embodiments herein.

DETAILED DESCRIPTION

Figure 1:
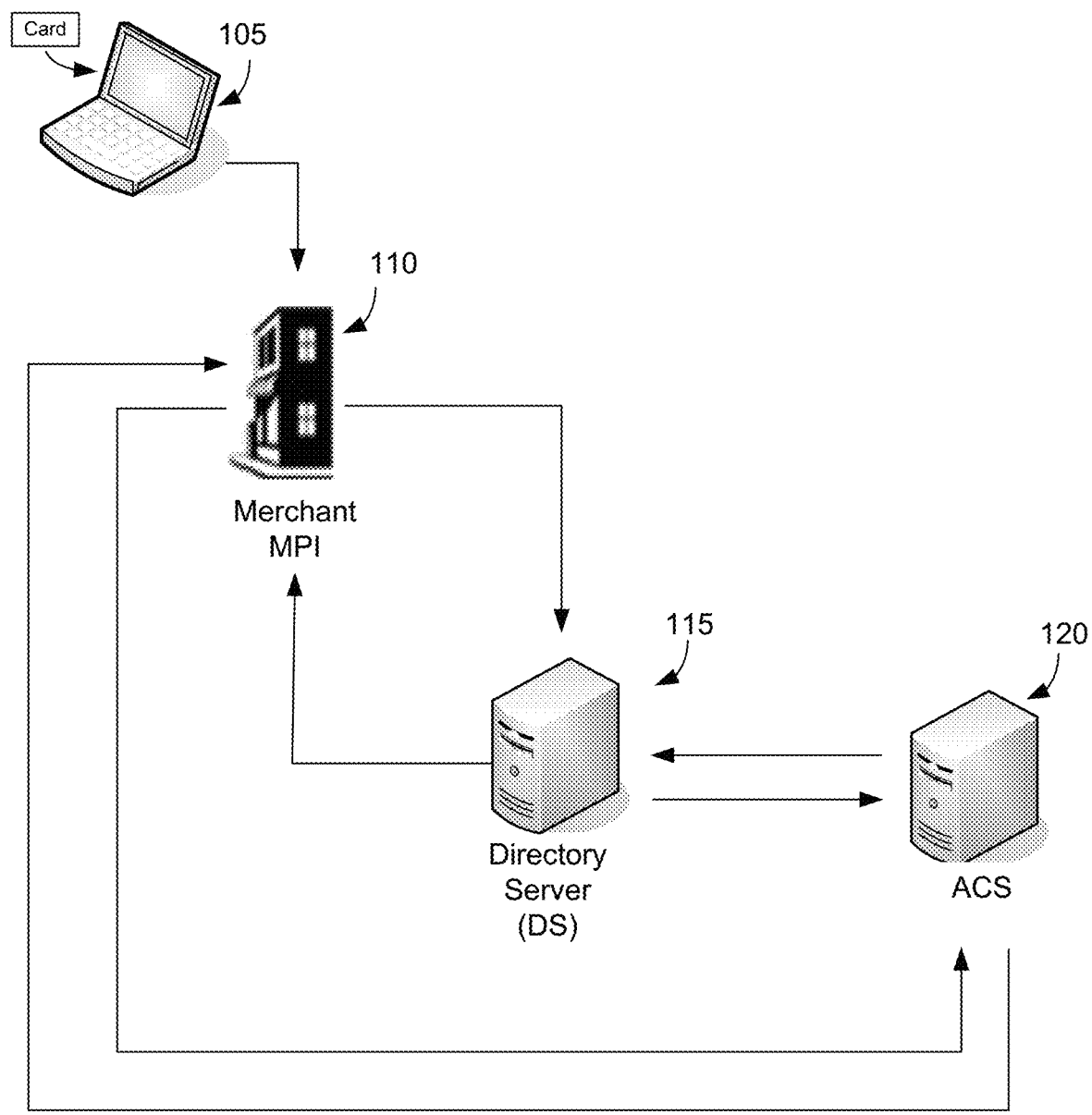
FIG. 1 is an illustrative depiction of a system for use in a general cardholder authentication.

In general, and for the purpose of introducing concepts of embodiments of the present disclosure, an authentication security policy relates to a process of verifying cardholder account ownership during a transaction in an online electronic commerce (e-commerce) environment, where that transaction may include a purchase transaction. As used herein, the terms purchase transaction and payment transaction or simply transaction may be used interchangeably unless stated otherwise. In general, the purchase transactions herein refer to card not present or e-commerce transactions. As such, these transactions may be requested by a merchant or other entity to have the cardholder, user, or other entity presenting a payment device for payment verified as an authorized user of the payment device since, for example, a merchant cannot physically verify the user is even in possession of the payment device.

In accordance with general aspects of the present disclosure, a process system, and method will be described wherein a payment card system, application, or service collects authentication data from various internal and external entities (e.g., applications, devices, services, etc.) of a business, enterprise, or organization within an authentication ecosystem, including but not limited to a 3DS environment, that can provide authentication services and stores the collected authentication data in a data repository such as a data warehouse, local or distributed storage facility, and a cloud based storage service. The collected authentication data may be used as a basis for business analytics including, for example, business reporting for internal and external customers of an enterprise or other business organization. Analysis based on the collected authentication data may, in some aspects, be utilized for transactional fraud scoring purposes. In some embodiments, data derived from the collected authentication data can be shared and used in combination with transaction data (e.g., purchase authorization data) within a data warehouse to provide a view of an end-to-end transaction lifecycle.

The present disclosure provides, at least in part, processes and systems for reporting an end-to-end or complete view of a transaction including authentication data used in the authorizing and processing of credit and other types of transactions. The authentication data determined, processed, collected, analyzed, and stored herein may be used to provide valuable insight into a business and other entities. Such insights may relate, but not be limited to, transactional patterns, authentication trends and patterns, card issuer authentication success and failure rates, fraud indicators due to multiple failures within certain card ranges or regions, cardholder trends on authentication abandonment, failure rates of certain authentication service providers, and trends on authentication methods used in particular transactions.

A number of methods, systems, and solutions have been proposed to provide a cardholder authentication process. One solution is MasterCard® SecureCode™ promulgated by the assignee of the present patent application that defines and provides a level of security relating to a cardholder authentication process. The MasterCard® SecureCode™ process incorporates aspects of the 3-D Secure™ Protocol Specification Core Functions, Version 1.0.2 effective 17 Apr. 2006. This particular implementation of 3-D Secure™ (also referred to herein as "3DS") includes support for the SPA (Secure Payment Application) algorithm and Universal Cardholder Authentication Field (UCAF) without changing the 3-D Secure™ specification, messages, or protocol. While some aspects herein may build on, rely on, and leverage various aspects of the 3-D Secure™ specification, the processes and systems herein are not limited to a security authentication protocol or process adhering to that specification or even authentication flows that may fit within the 3DS protocol. Even in some instances herein where some embodiments may be described in the context of a system and process interfacing with at least some aspects of the 3-D Secure™ specification, other or alternative authentication security protocols may be substituted without any loss of generality, including those now known and those that may be developed in the future.

FIG. 1 is an illustrative diagram of a system 100 for implementing a process that may be utilized for verifying a cardholder account ownership (i.e., cardholder authentication) in accordance with the 3-D Secure™ specification. As such, FIG. 1 provides, in part, an overview of a cardholder authentication system and process in accordance with the 3-D Secure™ specification. However, all details of the specification are not discussed herein since a complete detailed disclosure of such information may be readily understood by directly referencing the 3-D Secure™ specification and or discussions thereof. Moreover, since the concepts and details disclosed herein are not limited to a specific authentication protocol such as 3DS, an exhaustive detailing of the 3DS is not a prerequisite for a complete understanding of the current disclosure.

System 100 includes a plurality of entities that must interact with each other by exchanging multiple, specifically formatted messages over secure communication channels (as defined in the 3-D Secure™ specification). Accordingly, the cardholder authentication process of FIG. 1 is complex given the number and extent of specific entities, messages, and other requirements necessarily involved.

System 100 includes a cardholder 105 that interacts with a merchant's online presence. Typically, cardholder 105 visits a merchant's Web site using a browser on their device of choice and selects items (e.g., goods and/or services) for purchase. As part of the online ordering process, cardholder 105 checks out and finalizes the purchase transaction by providing payment credentials to the merchant. The payment credentials may include at least a primary account number (PAN) representative of the account to be used as a source of funds in the transaction, an expiration date associated with the PAN, and (billing) address information of the cardholder. The PAN and other information is provided to the merchant's Merchant Server Plug-in (MPI) 110, where the MPI is a software module executed on behalf of the merchant. MPI 110 operates to determine whether payment authentication is available for the PAN received from the cardholder. The MPI formats and sends a Verify Enrollment Request (VEReq) message including the PAN to a Directory Sever (DS) 115, where the DS is a computer server that can determine whether the PAN is within a range of PANs enrolled in the authentication service provided by system 100. The DS may comprise a computer having at least one processor, a memory to store program instructions and data, and a communication interface to interface with other devices.

Upon receiving the VEReq, DS 115 queries an Access Control Server (ACS) 120 device, where the address of the ACS is specified in the VEReq. The address of the ACS may be specified using a Web address URL (uniform resource locator) for the ACS. The specified ACS may be an issuer of the account represented by the PAN. In some embodiments, the ACS may be acting on behalf of the issuer of the PAN and the specified URL points to a Web address other than that of the issuer. ACS 120 may respond to the query by providing an indication of whether authentication is available for the PAN included in the VEReq. If the merchant is a participating acquirer and the merchant is a valid merchant, then ACS 120 may respond with a Verify Enrollment Response (VERes) message that indicates that authentication is available for the PAN included in the VEReq message. ACS 120 uses the PAN from the VEReq to determine whether the cardholder is enrolled in the authentication service.

In some instances, the MPI may store data related the ranges of PANS enrolled in the authentication service and determine whether the PAN is within a range of PANs enrolled in the authentication service provided by system 100.

In some aspects, the VERes may include a flag that authentication is available for the PAN (e.g., a PAN Authentication Available field may be set to "Y" indicating authentication is available). Conversely, ACS 120 may respond with a VERes that indicates that authentication is not available for the PAN (e.g., acquirer BIN and/or PAN not enrolled, ACS unresponsive to query, etc.). In some aspects, the VERes may include a flag that authentication is not available for the PAN (e.g., a PAN Authentication Available field may be set to "N" indicating authentication is not available or "U" indicating authentication is unavailable). In the event the VERes includes a flag, a value in a field thereof, or other mechanism to indicate that authentication is not available for the PAN, the authentication process provided by system 100 may be terminate or aborted.

ACS 120 further sends the VERes including the indication of whether authentication is available to DS 115. DS 115 will then forward the VERes to MPI 110. This may conclude the DS's participation in the authentication of the transaction but the authentication process is far from complete. Upon receipt of the VERes, MPI 110 reads the response to see if authentication is available for the transaction's PAN. If authentication is available, then MPI 110 sends a message including a Payer Authentication Request (PAReq) message to ACS 120 via the cardholder's browser using the ACS URL included in the VERes. The PAReq message requests the issuer ACS to authenticate its cardholder. The PAReq may include cardholder, merchant, and transaction-specific information. The cardholder information may include security information known only to the cardholder and the issuer. It is noted that the PAReq message is not shared with the merchant (or the MPI).

ACS 120 receives the PAReq and may proceed to validate the received message to ensure that it is properly formatted and includes the requisite information, including for example, digital certificates and a proper PAN Authentication Available flag (e.g., "Y"). ACS 120 may further determine whether to provide authentication of the cardholder. ACS 120 may provide an indication of that determination by providing a status for the transaction. Values for the status may include, in accordance with 3-D Secure™, "Y" meaning the customer is fully authenticated, "N" meaning the customer failed or canceled authentication (i.e. transaction denied), "U" meaning the authentication could not be completed (e.g., technical issues such as communication failures, time-outs, etc.), and "A" that provides proof that the authentication was attempted.

A message is sent from ACS 120 to MPI 110 that includes the transaction status as determined by ACS 120. The message may comprise a Payer Authentication Response, PARes message. In the event the transaction status is determined to be "Y", then the PARes will include an authentication token, AAV, that is sent to MPI 110. The PARes may be digitally signed to offer a level of security regarding the authenticity of the message itself. The PARes is received at MPI 110 through the cardholder's browser. Upon receipt of the PARes, MPI 110 may operate to validate the signature of the PAREs and determine whether to authorize the transaction based, at least in part, on the values comprising the VEREs.

If the cardholder is authenticated using the authentication process generally described above, then the purchase transaction may proceed to a purchase or payment authorization process and informs the MPI of the AAV value or token. The purchase authorization may be accomplished in a conventional manner after the MPI notifies the merchant payment system of the results of the authentication attempt.

It is again noted that the authentication of the cardholder or account as explained hereinabove with respect to FIG. 1 is just one example of an authentication flow compatible with the present disclosure. As such, other authentication flows and processes including at least some different entities communicating with each other using the same or different message types than those described above are within the scope of the present disclosure.

In some instances, if the authentication was not successful, the merchant may still proceed with a conventional transaction authorization without the authentication token, as an unauthenticated transaction. Liability for the processing of an unauthenticated transaction may in some such instances reside with the merchant. In accordance with some aspects herein, data including an indication of the unsuccessful cardholder authentication, will be documented and maintained.

As noted in conjunction with FIG. 1, numerous messages may typically be communicated between numerous different entities. As such, a cardholder authentication process may typically be a complex process given the number of parties involved, the number of specific messages that are exchanged between the different entities, the number of determinations that need to be made regarding the content of the exchanged messages, and the secure communication of the messages. In accordance with some aspects herein, all relevant phases of the authentication process are maintained in one or more tangible records, messages, or data structures.

Figure 2:
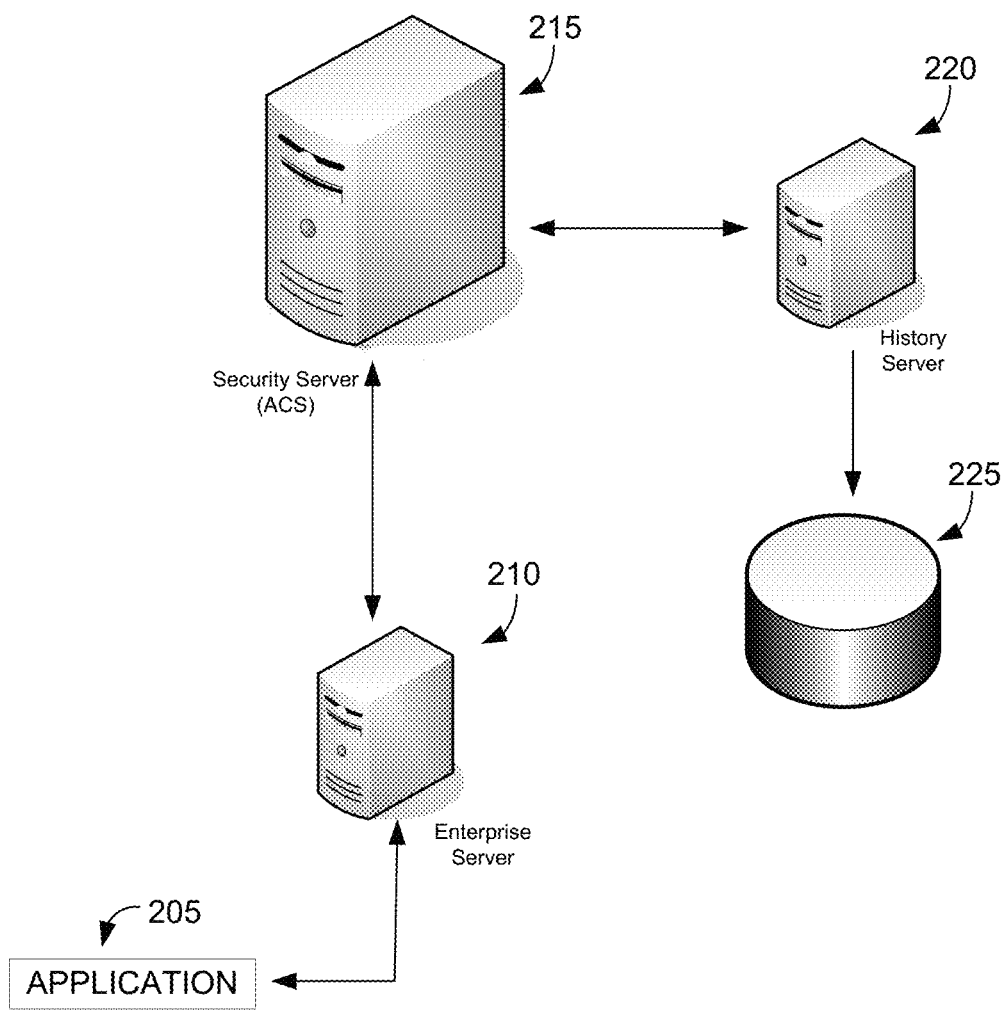
FIG. 2 is an illustrative depiction of a system, according to some embodiments herein.

FIG. 2 discloses a system 200 in accordance with some embodiments herein. System 200 includes an application 205. In some embodiments, application 205 may be internal to an enterprise, business, or other organization. As used herein, an "internal" application, service, device, or system is not exposed to a system, device, service, or communication channel outside of the particular enterprise, business, or other organization. In some embodiments, application 205 may be a software application or service configured in accordance with an API (application program interface) specification herein. The API may be referred to as an authentication API herein. The authentication API may specify the information to be included in an exchange of information between application 205 and another software application, device, system, or service such as, for example, an enterprise server 210. Enterprise server 210 may operate to receive a request for an authentication value or token from application 205 via an API call and in reply to that API call (i.e., request) send an authentication value via an API response to software application 205.

In some embodiments, the requested authentication value may comprise a security code that is compatible with a Universal Cardholder Authentication Field (UCAF) data structure that is compatible with an authentication payment environment. It is noted however that an authentication value in some embodiments herein is not limited to the UCAF data structure or an instance thereof. In accordance with some aspects herein, the requested authentication value may be compatible with one or more authentication flows being utilized in a particular transaction and/or use-case.

In some embodiments, the authentication payment environment may comprise a three-domain (3-D) security protocol, although other authentication flows and protocols may be used in some embodiments. In some embodiments and aspects, a process of generating and communicating the API call and the API response in reply thereto and the systems and devices to execute that process are separate and distinct from the security protocol. In some embodiments, aspects of a method and process herein may, in some instances, provide information to and/or receive information from a process and system comprising a security protocol but be distinct therefrom.

In one aspect, the request for an authentication value or token may be for a specific, particular transaction, where the authentication value returned or sent to calling application 205 in reply to the API call provides an authentication value that is valid for and specifically associated with the transaction specified in the API call. In some embodiments, the authentication value or token sent from enterprise server 210 to application 205 may be used by application 205 and/or other applications, systems, devices, and services in one or more processes performed by application 205 and/or the other applications, systems, devices, and services. As an example, the authentication value generated by enterprise server 210 and sent to application 205 in response to the API call from the application may be used as an indicator (i.e., proof) of a verified authentication and further included in a payment transaction authorization request or other process. In some embodiments, the authentication value may be formatted and encoded in a suitable manner (e.g., formatted, encoded, encrypted, etc.) such that a particular authorization request including the authentication value herein need not be altered to accommodate the authentication value and otherwise be processed. Accordingly, some embodiments of FIG. 2 may interface with and accommodate systems and processes including those currently known and future developed systems and process that may, at least in part, conform to one or more security protocols. In at least one use-case, the authentication value may be further used in a purchase transaction process including, at least in part, a purchase transaction authorization (e.g., credit card authorization). In some other embodiments, the authentication value obtained by enterprise server 210 in reply to the request by application 205 may be further formatted and/or encoded in a manner to accommodate the request and be compatible with the requesting application 205.

In some embodiments, it is noted that application 205 makes the authentication request using a single API call to enterprise server 210. Conversely, the enterprise server may provide a reply to application 205 using a single API response. In this manner, an authentication value may be obtained in an efficient process by requesting and receiving an authentication value or token using a single API call from an application. In some aspects, this is in contrast to some embodiments of the processes disclosed in reference to, for example, FIG. 1, that involve multiple different entities that necessarily communicate with each in a specific sequence(s) while exchanging specific messages adhering to specific message formats and communication session requirements, per a specific security protocol.

Referring to process 300 depicted in FIG. 3, a software application 205 makes an API call to enterprise server 210 at operation 305. From the perspective of the enterprise server 210, the API call requesting the authentication value is received by the enterprise server at operation 305. In some instances, the API call may comprise a SOAP (Simple Object Access Protocol) message, although other data communication protocols may be used without a loss of generality.

At operation 310, the enterprise server 310 may determine whether the request for the authentication value includes an indication that the request comprises a first transaction type. The first transaction type may be indicated by a value, a flag, a data field, or other mechanism included in or associated with the received API call. In one embodiment, the API call may comprise a message of a particular format that includes a parameter in a data field of the message where a particular value for that parameter indicates that the API call is to be processed in accordance with the subsequent operations 315 and 320 of process 300. In one embodiment, the indication that the request comprises a first transaction type is provided by virtue of the API call itself. That is, an embodiment of a system or device implementing process 300 may logically determine that since the enterprise server receives an API call requesting an authentication value, as opposed to receiving no API call or receiving some other type of message or request, then the API call may be further processed in accordance with process 300.

In some embodiments, the secure server 215 depicted in FIG. 2 may include an ACS or the like, where enterprise server 210 is placed in front of the secure server. In an instance a message received by enterprise server 210 is a security message conforming to a security protocol (e.g., SPA, 3DS, and other authentication flows including those not specifically recited herein), then the message may be routed to security server 215 (i.e., an ACS) and processed according to the applicable security protocol. In this instance, the message received by enterprise server 210 would be received from one of the entities specified by the security protocol, such as, for example, a merchant, a MPI, and a cardholder (e.g., an in-line browser window, etc.) in the particular format and including the data specified by the specific authentication protocol. In some embodiments, enterprise server 210 may route some message(s) of a particular type to an ACS for processing by the ACS in accordance with one or more security authentication protocols.

Returning to FIG. 3, process 300 proceeds to operation 315 where, in response to the determination that the request for the authentication value includes an indication of a first transaction type, the enterprise server generates an authentication value for the transaction associated with the API call received at operation 305. In some embodiments, generation of the authentication value or token may include the enterprise server 210 transforming the API call received from the software application to a verification request message (e.g., VEReq) or other message(s) depending on the authentication protocol being used. The verification request or other type of message may be transmitted to a security protocol processing backend system (e.g., a security authentication system including an ACS). Enterprise server 210 may receive, in reply to the verification request message, a verification response message (e.g., VERes) or other message(s) depending on the authentication protocol being used. In some instances, the verification request or other type of message and the verification response or other type of message may be exchanged over a same communication (e.g., HTTP) session. Upon receipt of the verification response or other type of message, enterprise server 210 may generate or otherwise formulate a payer authentication request (e.g., a PAReq) message or other message(s) depending on the authentication protocol being used that is subsequently transmitted to the security protocol processing backend system (e.g., an issuer ACS) for processing. Enterprise server 210 may receive, in reply to the payer authentication request message, a payer authentication response (e.g., PARes) or other message(s) depending on the authentication protocol being used. In some instances, the payer authentication request or other type of message and the payer authentication response or other type of message may be exchanged over a same communication (e.g., HTTP) session. The authentication value or token may be generated based on the payer authentication response or other type of message.

At operation 320, an API response including the generated authentication value (e.g., AAV or other message(s) depending on the authentication protocol being used) may be sent to the calling application (e.g., application 205). In some instances, the generated authentication value may be used by the calling application for reporting, analysis, dispute resolution, liability shifting, and further processing (e.g., included in a payment transaction authorization request) message.

In some aspects, the API call and the API response in reply thereto are internal to a particular business, system, organization, or other computing environment. In some regards, a context such as this where the data exchanged via the API calls and API response is not exposed externally may, for at least this reason, fall outside of the purview of one or more security protocols. In some embodiments, one method of receiving the authentication results is through defined authentication protocol methods and messages that are designed to provide accurate results of the transaction so that the transaction can be later recalled for the purpose of, for example, chargeback dispute resolution. By providing an accurate end-to-end account of transactions, payment networks can facilitate determining where fraud liability may lie in the event of fraud. The end-to-end transaction record is accomplished in some embodiments by an issuer ACS (e.g. FIG. 2, ACS 215) sending specific messages called a payer authentication transaction request (PATrans Request) or other messages in a different authentication protocol to the authentication history server (e.g. FIG. 2, ACS 220). The data contained within this message may be stored and synchronized to a data warehouse (e.g. FIG. 2, ACS 225). In some aspects, at least a part of the data set stored in the data warehouse contains the initial transaction from the merchant as received from the directory server (DS) or other entity depending on context or use-case. Once the authentication activities documented in the PATrans Request (or other like message) and the initial transaction data are combined and analyzed, valuable data including insights into the full authentication request can be determined.

In some embodiments, an authentication API in accordance with some aspects herein may include one or more data fields. Table 1 below is a tabular listing of some data fields that may be specified for implementing an API that may be used by a web service or application in accordance with some embodiments herein. In some embodiments, the data fields listed in Table 1 may be described in an interface description language (e.g., Web Service Description Language, WSDL) and provided to a developer of a web service or application for use by the developer or other entity to generate a web service or application that may effectively communicate using an appropriately define API.

In some embodiments, the authentication API may require or expect a value to be specified for all of the data fields listed in Table 1. That is, the API call may include a corresponding value for each of the data fields listed in the table. In some other embodiments, some but not necessarily all of the data fields specified in Table 1 may have a corresponding value supplied in the API call. For example, some instances of an authentication API herein may specify a value for a PAN (i.e., payment account number), a merchant name, and an expiry date corresponding to the PAN. These minimal values may be included in the API call and may be sufficient for the request of an authentication value in some embodiments herein. In accordance with some embodiments herein, the data received by or provided to an authentication history server herein contains at least some of the following components:

TABLE 1

Merchant Name
Merchant Country Code
Merchant URL
Merchant ID
Acquirer BIN
Purchase Date
Transaction Identifier
Purchase Amount
Purchase Currency
Currency Exponent
Recurring Payment Data
Installment Payment Data
PAN
Card Expiry Date
Account Identifier
Transaction Time
Transaction Status
Authentication Values
Transaction Indicator
Customer IP Address
Authentication Method Used Table 1 includes an illustrative sample listing of data for some embodiments herein. The listed data may not be holistic or exhaustive. Accordingly, other data such as high level cardholder information and other transactional data may also be stored or received by and/or provided to an authentication history server in some embodiments herein.

In some embodiments, an application operative in accordance with process 300 may include a electronic payment wallet application developed on behalf of an issuer. As part of the development and deployment of the electronic wallet, authentication of the electronic wallet may be assigned or passed to a payment network provider or other entity. At the time of a log-in for the wallet application, there may be some level of authentication that verifies the authenticity or identity of the wallet application with the issuer of the wallet. Accordingly, there may not be a need for a merchant at the time of a purchase involving a customer to authenticate the wallet at a check-out since the wallet application has already been authenticated with the issuer. In some instances, the wallet authentication is done as part of a wallet initiation process.

While the user associated with the wallet application of this example has already been authenticated with the issuer to a level of authentication determined and designed to satisfy the concern(s) of the issuer and/or others (i.e., "pre-authenticated"), the particular authentication may not provide an authentication value or token such as an AAV value that may normally be generated by and/or in accordance with a security protocol. In an effort to obtain an authentication value or token (e.g., a AAV value), the electronic wallet application may request the authentication value via an API call in accordance with the present disclosure. The API call may be presented directly to a service to pull an authentication value therefrom. In some aspects, the API call from the application may obtain the authentication value without the need to satisfy all of the requirements of one or more security protocols since, for example, the issuer or an entity acting on behalf thereof has agreed to processing of the API call given certain conditions are satisfied. In some embodiments, an agreement to accept and process the API calls from an application in accordance with the present disclosure are determined before the API call is received by an enterprise server herein (e.g., before an operation 305 of process 300). In some aspects, the authentication of the electronic wallet in the present example may be said to comprise a pre-authorized authentication.

In some embodiments, a policy governing the authentication of the electronic wallet or other calling application may vary depending on the calling application, the intended use of the authentication value or token by the calling application, and other considerations.

Continuing with the electronic wallet example, in an instance a customer cardholder logs into a merchant's wallet service, the customer registered with the wallet service may be considered to have already been authenticated (i.e., pre-authorized authentication). In this case however, an authentication value or token may be desired for use in a payment authorization request associated with a purchase transaction of the customer. In some embodiments, the payment authorization request will be expected by an issuer (or entity acting on behalf thereof) to include the authentication value or token. In some aspects, the payment authorization may not be processed in the absence of the expected authentication value or token.

In some embodiments, inclusion of the authentication value or token in the payment authorization request may facilitate processing of the payment authorization in accordance with a known, predetermined, or future developed process flow. The absence of the expected authentication value or token in the payment authorization request may trigger the processing of the payment authorization in accordance with an alternative or "exceptions" process flow or a termination of the process flow.

Referring to FIG. 2, in some embodiments security server 215 may forward a record or representation of the authentication value or token generated by enterprise server 210 to a history server 220. History server 220 may further send transaction details to a database 225. The transaction details may be used in further processing, reporting, and analytics.

Figure 4:
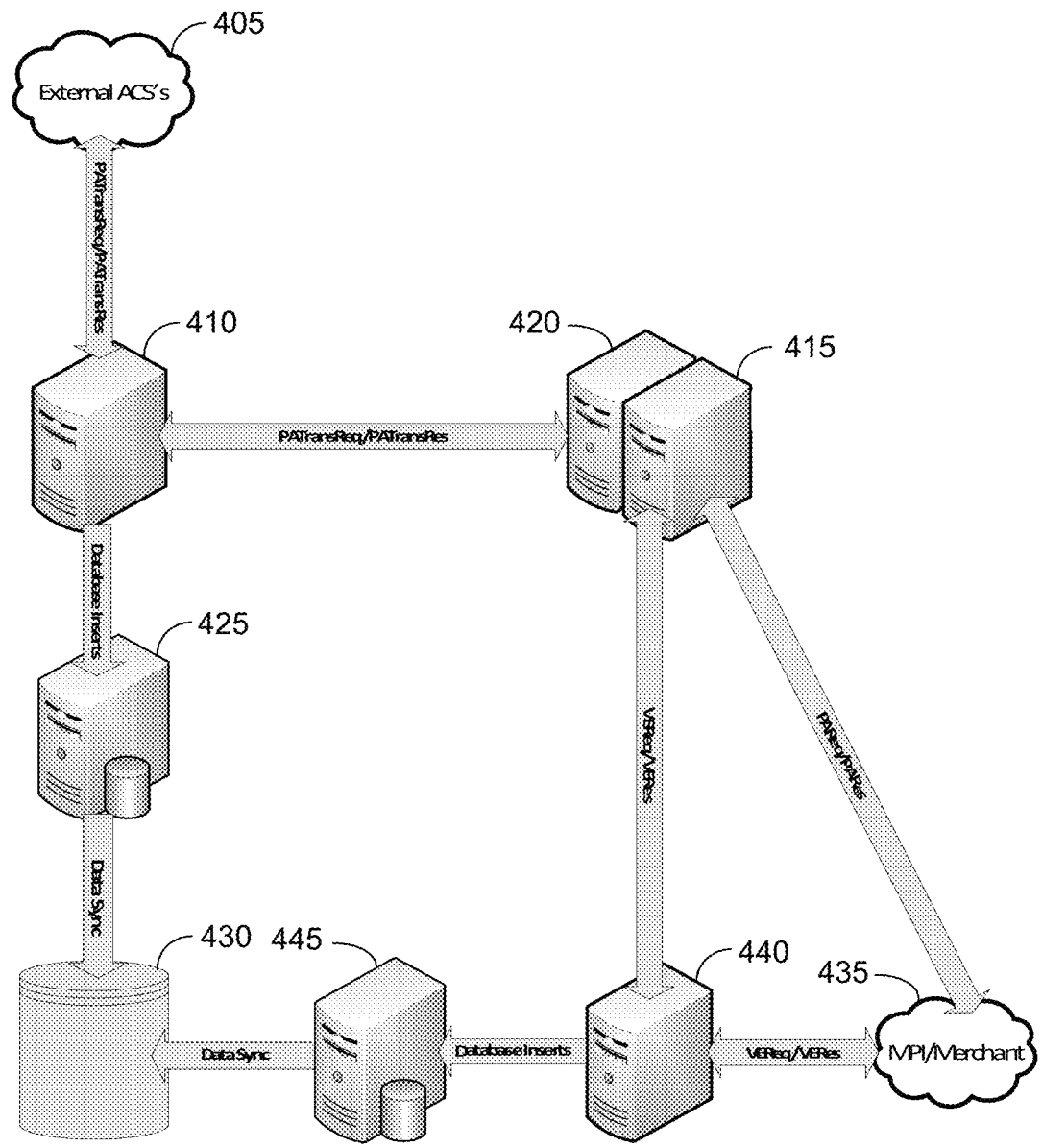
FIG. 4 is an illustrative depiction of a system, according to some embodiments herein.

Referring to FIG. 4, an illustrative depiction of a system 400 according to some embodiments herein is shown. In some regards, FIG. 4 discloses logical aspects of an authentication platform including a history server that may record and log an end-to-end transaction flow of every authentication request of an authentication process (e.g., including 3-D Secure™ but not limited thereto). Accordingly, actual systems may include fewer, more, or different devices and entities in arrangements not explicitly shown in FIG. 4, without any loss of generality or applicability. In some aspects, system 400 may include a platform that may leverage some aspects of a conventional authentication system such as that disclosed in FIG. 1 (though not limited thereto), as well as some aspects of the novel system disclosed in FIG. 2. In some aspects, system 400 and the processes implemented thereby may operate to process millions of transactions and authentication requests, every single day. Such processing scope and scale, including every authentication request whether the authentication request was completed and the initial purchase transaction is also represented in an associated purchase authorization or whether the authentication request was completed, is made possible by system 400. Accordingly, system 400 necessarily comprises computer devices, systems, and networks that are improved, as opposed to being limited to implementing a known process.

In some aspects, system 400 includes an application server 410 that may receive payer authentication request (PAReq) messages or other message(s) depending on the authentication protocol being used and payer authentication request (PARes) messages or other message(s) depending on the authentication protocol being used associated with transaction from one or more sources. In accordance with some authentication systems and processes, the PAReq or other messages and PARes or other messages may be received from an ACS 405 external to an enterprise environment. In some aspects, the PAReq messages and PARes messages may be received from an issuer ACS of a system configured, at least in part, similar to system 100 of FIG. 1. The transaction PAReq and PARes or other data received from the external ACS's may be requested from external ACS provider(s). The PAReq and PARes data received by server 410 may be sent to a database server 425. Server 425, also referred to herein as a "history server", may operate to track, store, format, encode, and/or encrypt the received data to insert the PAReq and PARes or other authentication data into a database table, system, other data structures, and a data storage service.

In some aspects, server 410 may receive PAReq and PARes data associated with transactions from one or more servers internal to an enterprise environment, such as, for example, from servers 415 and 420. Servers 415 and 420 may be one or more devices or systems functioning as, at least in part, an ACS. In some embodiments, ACS 415 is an internal ACS that may be internal to an enterprise environment such as, for example, the security (ACS) server 215 of FIG. 2. As stated earlier with respect to FIG. 2, system 200 including the enterprise server 210 and other components therein may operate internal to an enterprise environment wherein enterprise 200 generates an authentication value in response to an API call from application or service 205. In accordance with the generation of the authentication value, ACS 415 may have transaction PAReq and PARes data or other message(s) depending on the authentication protocol being used.

In some embodiments, server 420 may include an online authentication service ACS provided by an enterprise, whereas in some embodiments server 420 may include other types of ACS servers that may, at least on occasion, communicate with applications, devices, and/or services external to the enterprise environment. Server 420 may have transaction PAReq and PARes data or other authentication data associated with certain online and other types of transactions. The PAReq and PARes or other authentication data from servers 415 and 420 may be transmitted to application server 410 and then to history server 425.

Other aspects of the authentication process data, namely the verify enrollment request (VEReq) messages and verify enrollment response (VERes) messages or other message(s) depending on the authentication protocol being used may be received from one or more servers 415 (e.g., the internal ACS server) and a directory server (DS) 440. In some aspects, server 415 is the internal ACS that may facilitate the internal generation of an authentication value for a transaction, as discussed with respect to FIG. 2. As such, the VEReq and VERes data corresponding to the associated transaction(s) is stored by internal ACS 415. This VEReq and VERes or other message(s) may be transmitted to an application server 440 for, at least, storage purposes.

In some instances, VEReq and VERes or other message(s) may be generated with the assistance and in cooperation with external devices, applications, and services, such as system 100 of FIG. 1. Accordingly, the VEReq and VERes or other data associated with some transactions may be received via server 440 from a merchant MPI interface 435 and stored on DS 445.

In some aspects, whether the VEReq and VERes data is received from an internal ACS or a server 440, DS server 445 may operate to track, store, format, encode, and/or encrypt the received data to insert the VEReq and VERes or other data into a database table, system, and other data structures. In some embodiments, an indication of the source or the type of device that provides the VEReq and VERes or other data is included in the VEReq and VERes data or other message(s) depending on the authentication protocol being used. This source indicator may provide insight into whether the authentication token request associated with a particular transaction was generated by an internal process (e.g., FIG. 2) or an external process, device, service, or system.

The data in both history server 425 (i.e., PAReq and PARes or other data) and DS server 445 (i.e., VEReq and VERes or other data) may be synced and otherwise processed, combined, or aggregated for inclusion in a data warehouse, storage facility, device, or system 430. In some embodiments, data warehouse 430 may comprise a database management system or an instance of a node of a database management system. In some aspects, the combined PAReq/PARes or other data and the VEReq/VERes or other data may comprise a single data record or data structure representation thereof. The combined data record may provide, in addition to other transaction details, an end-to-end view of a transaction flow, including whether authentication was requested by a merchant, whether the authentication was provided by an issuer, whether the authentication was approved or denied, and whether payment authorization for the transaction was requested and whether it was approved or denied.

In some aspects, the data in the data warehouse 430 may be accessed by other systems and devices (not shown) and used to provide insight into the transactions. In some instances, enterprise level analytics may be used to analyze the data to, for example, generate reports, presentations, and dashboards. In some aspects, the data in data warehouse 430 may be used by various organizations of an enterprise to, for example, settle transaction disputes, to manage and respond to issuer or merchant complaints, to manage compliance programs, to manage abandonment rates, etc. In some embodiments, system 400 facilitates and enables the functionality to determine unique patterns in transactions and better ascertain user and merchant practices (e.g., fraud, etc.) than previous methods of transactional data collection.

In some embodiments, the authentication data processed and collected in accordance with some aspects herein may be used in a process, system, and device to score or provide an indication of a risk level of a particular transaction based on, for example, historical authentication patterns and/or historical authentication velocities of an account or identity. In this and other contexts, the historical authentication activity may, at least in part, be compared to a current request to determine whether the authentication data falls outside (within) observed, expected, desired, calculated, or predicted patterns, ranges, and "norms". In some aspects, the authentication data processed and stored herein may be aggregated in an effort to facilitate analyzing, storing, retrieving, and reporting functions using the data.

As part of an authentication ecosystem or platform 500 herein, on-behalf authentication services 505 may be called by an Access Control Server (ACS) or some other system to provide the actual authentication in an "out of band" method, which can include, for example, a one-time passcode generation and validation service, a mobile application, a biometric validation service, and other types of services, processes, applications, and use-cases. The results of all of these and other requests can also be fed into a data repository within a data warehouse that can be interfaced with other data to provide detailed transactional reporting and analytics.

Figure 5:
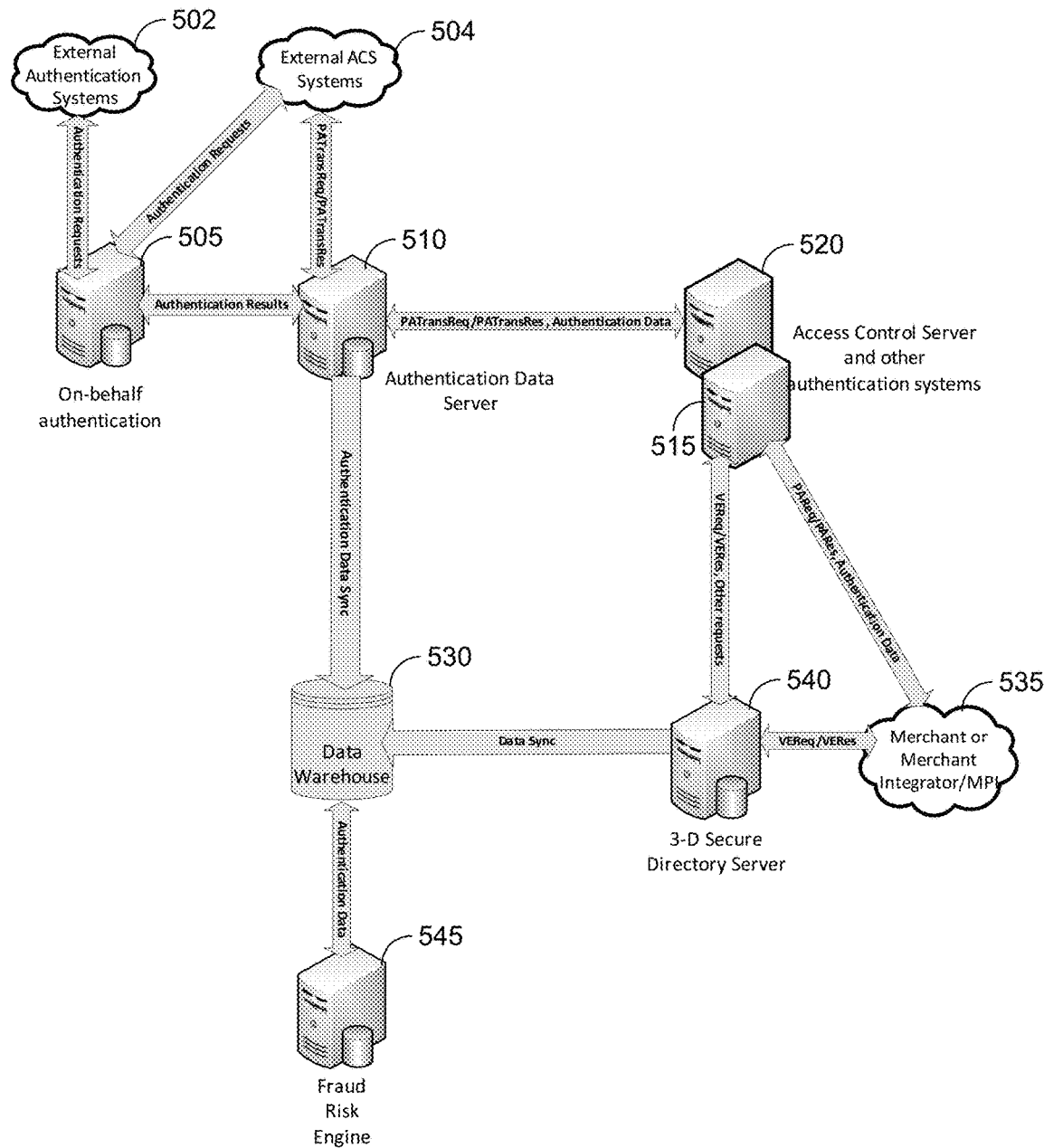
FIG. 5 is an illustrative depiction of a system, according to some embodiments herein.

Referring to FIG. 5, some embodiments relate to data collected from internal authentication systems (ACS 515 and authentication system 520) and external authentication systems (e.g., external authentication system 502 and external ACS 504). Data from the internal (515, 520) and external (502, 504) authentication systems is transmitted through an authentication history server 510. Authentication history server 510 may operate to transmit the authentication data received from both the internal and external sources to data warehouse 530. In some aspects, an authentication directory server (DS) 540 is provided in the authentication platform 500 of FIG. 5. DS 540 may interact with a merchant or merchant MPI 535 and the internal ACS and internal authentication system to facilitate the internal generation of an authentication value for a transaction, as discussed with respect to FIGS. 2 and 4. As such, VEReq and VERes or other message data corresponding to the associated transaction(s) can be stored by internal ACS 515. This VEReq and VERes or other message(s) may be transmitted to application server 540 for, at least, storage purposes.

When the authentication data is in the data warehouse, it can be used for one or more purposes including, for example, business reporting, service billing, etc. In some aspects, the authentication related data obtained and stored in data warehouse 530 can be consumed by other systems, applications, and services. For example, a system, device, application, or service 545 developed and implemented to score transactional fraud risk may interact with the authentication data stored in data warehouse 530. In some aspects, using the authentication data stored in data warehouse 530 to determine patterns in transactions and authentication velocities (i.e. recent authentication successes and failures), a fraud risk score can be further augmented based on the authentication data.

In some aspects, authentication history server herein collects data from various sources (e.g., 515, 520) within the authentication platform and from authentication systems (e.g., 502, 504) that provide "on-behalf" services such as, for example, a biometrics platform or a one-time passcode generation and validation system. Transactional (and other) data can also be received by the authentication history server (e.g., 510) from the DS system in order to provide a full end-to-end transaction view. This data, from multiple sources both internal and external to an organization, network, or enterprise can be transmitted to a data warehouse (e.g., 530) where it can be consumed for internal and external business reporting and analysis, as well as, for example, be consumed by risk scoring systems 545 to facilitate transaction fraud assessments.

FIG. 6 is a flow diagram of a process, in accordance with some embodiments herein. Referring to process 600, a payer authentication request (PAReq) message and a payer authentication response (PARes) message (or other messages and data depending on a particular authentican protocol used) associated with a transaction is received from at least one access control server (ACS) external to a particular enterprise environment at operation 605. As illustrated in FIG. 4, the external ACS may be an issuer ACS associated with and provided by or on behalf of an issuer participating in an authentication process or protocol.

Process 600 further includes receiving, at operation 610, from at least one access control server (ACS) internal to the enterprise environment, a verify enrollment request (VEReq) message and a verify enrollment response (VERes) message (or other messages and data depending on a particular authentican protocol used) associated with the transaction. In accordance with one embodiment herein, the VEReq and VERes data may be received from a computer or other device including a machine processor. The internal ACS may include an ACS provided as disclosed hereinabove to generate an authentication token internal to an enterprise environment (e.g., FIG. 2).

In some embodiments, the at least one ACS internal to the enterprise environment may be selected from a number of different devices, systems, applications or services. In some embodiments, the at least one ACS internal to the enterprise environment may be selected from an online authenticating service ACS, where the online authenticating service provides a mechanism for authenticating payment device users conducting some certain types of online payment and purchase transactions. In some embodiments, the at least one ACS internal to the enterprise environment may be an enterprise ACS internal to the enterprise environment as disclosed herein (e.g., FIG. 2). In some further embodiments, the at least one ACS internal to the enterprise environment may be an authentication value ACS that generates VEReq messages and VERes messages by communicating with at least one device external to the enterprise environment. Such an ACS may, in some aspects, by a "hybrid" ACS that operates both internally within the enterprise environment and at other times communicates with devices, systems, applications, and services external to the enterprise, at least to receive or transmit some data.

At operation 615, the PAReq message and the PARes message (or other messages and data depending on a particular authentication protocol used) associated with the transaction is combined with the VEReq message and the VERes message (or other messages and data depending on a particular authentication protocol used) associated with the transaction into a single data record. In some aspects, a determination may be made to determine whether specific VEReq/VERes or other messages correspond with certain other specific PAReq/PARes or other messages in an effort to ensure that transaction data is accurately tracked and logged and integrity of the data is maintained.

Process 600 continues to operation 620, where the single data record generated at operation 615 is stored in a data storage device. In some embodiments, the data storage device may include a database system or aspects thereof, including but not limited to various form factors of storage devices such as solid state memory devices, magnetic disk drives, and other non-transitory storage devices. The database may include a relational database, including in some aspects an instance of in-memory database.

The data record stored during operation 620 may include all aspects of a transaction, including for example, VEReq/VERes or other messages, PAReq/PARes or other messages, payment authorization details (e.g., servicers, networks, issuer and acquirer institutions, payment transaction line item details, etc.), and other information. The data in the stored record may be sufficiently detailed and comprehensive as to provide an end-to-end view of a transaction, including the entities participating in the transaction at each point of processing contact.

In some aspects, the processes disclosed herein may be combined, at least in part. For example, individual processes and individual operations therein may be combined to effectuate different authentication processes, in accordance with some aspects herein.

Applicants reiterate that the particular authentication systems and protocols disclosed herein are examples of some embodiments of the present disclosure, and not strict limitations thereof. For example, the payer authentication request (PAReq) message or the like may be referred to as a first authentication message, the payer authentication response (PARes) message or the like may be referred to as a second authentication message, the verify enrollment request (VEReq) message or the like may be referred to as a first enrollment message, and the verify enrollment response (VERes) message or the like may be referred to as a second enrollment message.

Figure 7:
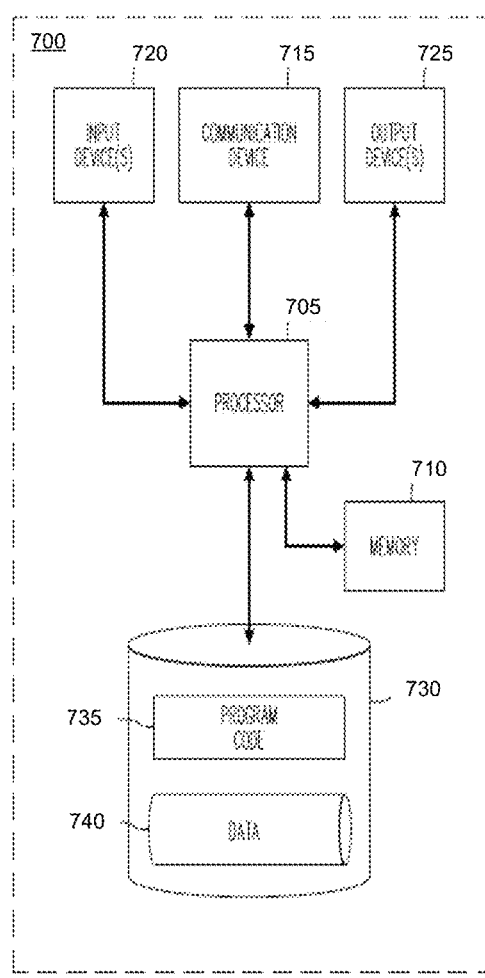
FIG. 7 is a schematic block diagram of an apparatus, according to some embodiments herein.

FIG. 7 is a block diagram overview of a system or apparatus 700 according to some embodiments. System 700 may be, for example, associated with any of the devices described herein, including for example an enterprise server, a history server, and like functionality in accordance with processes disclosed herein. System 700 comprises a processor 705, such as one or more commercially available Central Processing Units (CPUs) in the form of one-chip microprocessors or a multi-core processor, coupled to a communication device 715 configured to communicate via a communication network (not shown in FIG. 7) to another device or system. In the instance system 700 comprises a server (e.g., supporting the functions and services provided by an enterprise server, a history server, etc.), communication device 715 may provide a mechanism for system 700 to interface with another device, system, or service (e.g., an instance of a security server 215). System 700 may also include a local memory 710, such as RAM memory modules. The system further includes an input device 720 (e.g., a touchscreen, mouse and/or keyboard to enter content) and an output device 725 (e.g., a touchscreen, a computer monitor to display, a LCD display).

Processor 605 communicates with a storage device 730. Storage device 730 may comprise any appropriate information storage device, including combinations of magnetic storage devices (e.g., a hard disk drive), optical storage devices, solid state drives, and/or semiconductor memory devices. In some embodiments, storage device 630 may comprise a database system.

Storage device 730 may store program code or instructions 735 that may provide computer executable instructions for tracking various aspects of an authentication value generation transaction, determining a complete record of the transaction and storing the complete record for further processing and reporting purposes, in accordance with processes herein. Processor 705 may perform the instructions of the program instructions 735 to thereby operate in accordance with any of the embodiments described herein. Program code 735 may be stored in a compressed, uncompiled and/or encrypted format. Program code 735 may furthermore include other program elements, such as an operating system, a database management system, and/or device drivers used by the processor 705 to interface with, for example, peripheral devices. Storage device 730 may also include data 740 such as database records or look-up tables, including for example records of merchants, issuers, and acquirers participating in a particular authentication program or service and the addresses of the devices used by those entities to implement the service. Data 740 may be used by system 700, in some aspects, in performing one or more of the processes herein, including individual processes, individual operations of those processes, and combinations of the individual processes and the individual process operations.

All systems and processes discussed herein may be embodied in program instructions stored on one or more non-transitory computer-readable, processor-executable media. Such media may include, for example, a solid state drive, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, the method comprising:
generating, by at least one access control server (ACS) internal to an enterprise environment, an authentication token internal to the enterprise environment in response to receiving an authentication request for a transaction, the authentication request being received via an application program interface (API) call from an application internal to the enterprise environment;
in response to receiving the API call, transmitting, by the at least one ACS internal to the enterprise environment, an API response to the application internal to the enterprise environment, wherein the API response comprises the authentication token;
receiving, by a first server internal to the enterprise environment from at least one ACS external to the enterprise environment, a first authentication message and a second authentication message associated with the transaction, the first authentication message and the second authentication message conforming to an authentication protocol and including the authentication token;
storing the first authentication message and the second authentication message in a history server in the enterprise environment, the history server receiving the first authentication message and the second authentication message from the first server internal to the enterprise environment;
generating, by the at least one ACS internal to the enterprise environment, a first enrollment message and a second enrollment message associated with the transaction and conforming to the authentication protocol;
storing, by a second server internal to the enterprise environment, the first enrollment message and the second enrollment message, the second server internal to the enterprise environment receiving the first enrollment message and the second enrollment message from the at least one ACS internal to the enterprise environment;

receiving and storing, by a directory server, the first enrollment message and the second enrollment message from the second server internal to the enterprise environment;

receiving, by an instance of a database management system, the first authentication message and the second authentication message associated with the transaction from the history server;

receiving, by the instance of a database management system, the first enrollment message and the second enrollment message associated with the transaction from the directory server;

combining, by the instance of a database management system, the first authentication message and the second authentication message associated with the transaction, the first enrollment message and the second enrollment message associated with the transaction, and payment authorization details of the transaction into a single data record, wherein the payment authorization details of the transaction include at least the authentication token;

storing, by the instance of a database management system, the single data record in a shared data storage device; and determining, by the instance of a database management system, a score for the transaction based on the stored single data record and a historical authentication pattern, the determined score being indicative of whether the authentication request is within a predetermined range of values.

2. The method of claim 1, wherein the first enrollment message and the second enrollment message associated with the transaction include an indication of a source of the first enrollment message and the second enrollment message.

3. The method of claim 1, wherein the at least one ACS internal to the enterprise environment comprises at least one of: an online authentication service ACS, an enterprise ACS internal to the enterprise environment, and an authentication value ACS generating second verify enrollment response messages by communicating with at least one device external to the enterprise environment.

4. The method of claim 3, wherein the second enrollment message includes an indication of a type of ACS sourcing the second enrollment message.

5. The method of claim 1, wherein the first authentication message is a payer authentication request message, the second authentication message is a payer authentication response message, the first enrollment message is a verify enrollment request message, and the second enrollment message is a verify enrollment response message associated with the transaction.

6. A system comprising:
an enterprise environment comprising:
 a first server internal to the enterprise environment receiving from at least one access control server (ACS) external to the enterprise environment, a first authentication message and a second authentication message associated with a transaction, the first authentication message and the second authentication message conforming to an authentication protocol and including an authentication token;
 a history server storing the first authentication message and the second authentication message, the history server receiving the first authentication message and the second authentication message from the first server internal to the enterprise environment;
 at least one ACS internal to the enterprise environment, the at least one ACS internal to the enterprise environment:
  generating the authentication token internal to the enterprise environment in response to receiving an authentication request for the transaction, wherein the authentication request is received via an application program interface (API) call from an application internal to the enterprise environment;
  in response to receiving the API call, transmitting an API response to the application internal to the enterprise environment, the API response including the authentication token; and
  generating a first enrollment message and a second enrollment message associated with the transaction and conforming to the authentication protocol;
 a second server internal to the enterprise environment storing the first enrollment message and the second enrollment message, the second server internal to the enterprise environment receiving the first enrollment message and the second enrollment message from the at least one ACS internal to the enterprise environment;
 a directory server receiving the first enrollment message and the second enrollment message from the second server internal to the enterprise environment and storing the first enrollment message and the second enrollment message;
 an instance of a database management system, the instance of a database management system:
  receiving the first authentication message and the second authentication message associated with the transaction from the history server;
  receiving the first enrollment message and the second enrollment message associated with the transaction from the directory server;
  combining the first authentication message and the second authentication message associated with the transaction, the first enrollment message and the second enrollment message associated with the transaction, and payment authorization details of the transactions into a single data record, wherein the payment authorization details of the transaction include at least the authentication token;
  storing the single data record in a shared data storage device; and
  determining a score for the transaction based on the stored single data record and a historical authentication pattern, the determined score being indicative of whether the authentication request is within a predicted range of values.

7. The system of claim 6, wherein the first enrollment message and the second enrollment message associated with the transaction include an indication of a source of the first enrollment message and the second enrollment message.

8. The system of claim 6, wherein the at least one ACS internal to the enterprise environment is selected from a group of: an online authentication service ACS, an enterprise ACS internal to the enterprise environment, and an authentication value ACS that generates second verify enrollment response messages by communicating with at least one device external to the enterprise environment.

9. The system of claim 8, wherein the second enrollment message includes an indication of a type of ACS from which the second enrollment message is received.

10. The system of claim 6, wherein the first authentication message is a payer authentication request message, the second authentication message is a payer authentication response message, the first enrollment message is a verify enrollment request message, and the second enrollment message is a verify enrollment response message associated with the transaction.

* * * * *